Nov. 1, 1966 H. RIEDEL 3,281,976

TRANSPARENCY FRAMES AND MEANS FOR LOADING TRANSPARENCIES INTO SUCH FRAMES

Filed Sept. 15, 1964 11 Sheets-Sheet 1

Nov. 1, 1966 H. RIEDEL 3,281,976

TRANSPARENCY FRAMES AND MEANS FOR LOADING TRANSPARENCIES INTO SUCH FRAMES

Filed Sept. 15, 1964 11 Sheets-Sheet 4

Nov. 1, 1966 H. RIEDEL 3,281,976

TRANSPARENCY FRAMES AND MEANS FOR LOADING TRANSPARENCIES INTO SUCH FRAMES

Filed Sept. 15, 1964 11 Sheets-Sheet 6

Nov. 1, 1966 H. RIEDEL 3,281,976

TRANSPARENCY FRAMES AND MEANS FOR LOADING TRANSPARENCIES INTO SUCH FRAMES

Filed Sept. 15, 1964 11 Sheets-Sheet 9

United States Patent Office 3,281,976
Patented Nov. 1, 1966

3,281,976

TRANSPARENCY FRAMES AND MEANS FOR LOADING TRANSPARENCIES INTO SUCH FRAMES

Herbert Riedel, Spitalmuhlenstrasse 13,
717 Schwabisch-Hall, Germany

Filed Sept. 15, 1964, Ser. No. 400,299
Claims priority, application Germany, Sept. 18, 1963, R 36,148
5 Claims. (Cl. 40—152)

This invention relates to a transparency frame made of an integral, preferably plastics molding, and to apparatus for loading transparencies into such frames.

Substantially the transparency frame according to the invention is an integrally formed molding, preferably a plastics molding, adapted to be loaded with a transparency in a simple, appropriately constructed, hand or automatically operable machine wherein the leading end of the uncut film is inserted into the frame, adjusted by visual inspection until the transparency at the end of the film is in accurate register with the window of the frame, and the transparency is then cut from the film inside the film-receiving recess of the frame by cutting means associated with mechanism for closing the frame.

In a preferred embodiment of a frame according to the invention, a flexural hinge is formed in the integral molding by a connecting web between the two halves of the frame, said web having a tapering cross section so contrived that when the frame is closed the flexurally stressed outside of the web is forced to rotate in a controlled spiral path about a rounded core until projecting ribs on the inside of one half of the frame engage cooperating grooves in the other half of the frame, fracture of the web due to kinking of the web being thereby avoided.

According to the invention it may be advisable to locate the spiral of the hinge-forming web sufficiently far down the side of the frame to prevent parts from projecting when the frame has been closed and impairing the function of the frame as a slide.

The present invention provides the advantage of permitting transparencies to be fully automatically framed, a facility of the utmost importance to the photographic processing industry.

Moreover, framing can be accomplished in a very simple and inexpensive hand-operated machine which may also be used by the amateur and smaller processing firms because it facilitates the clean and accurate framing of transparencies cut from the film.

Figures 1, 2, 3:
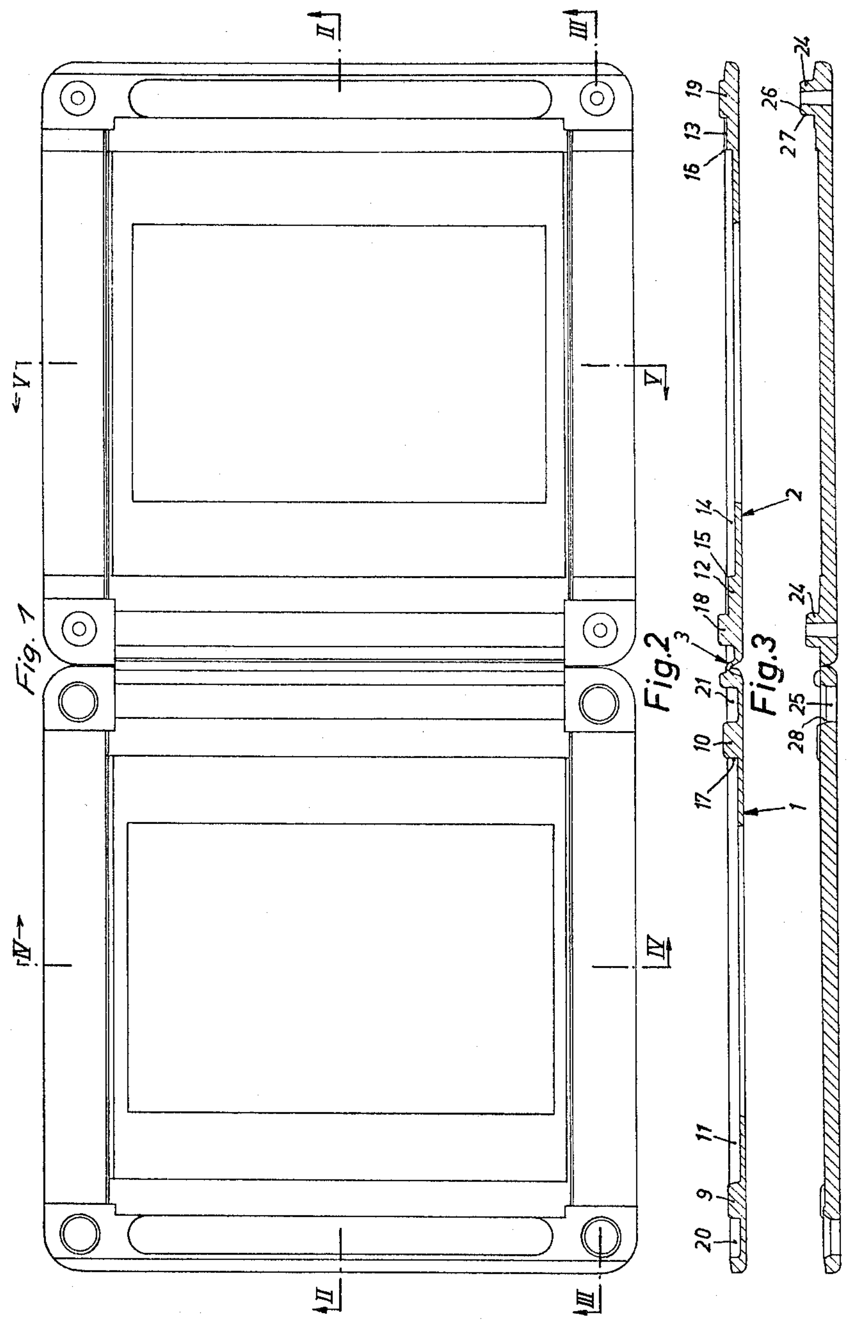
Figures 4, 5, 6:
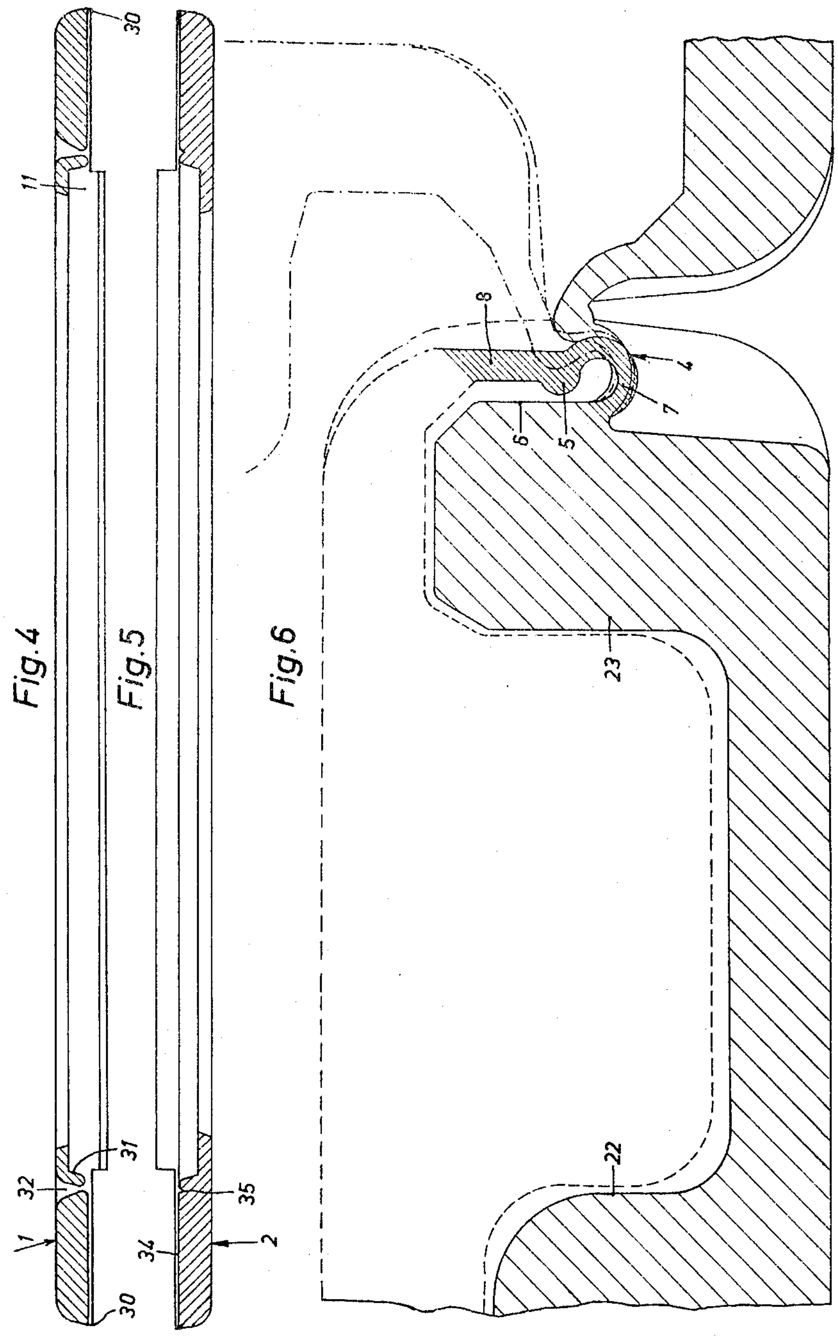
Figure 7:
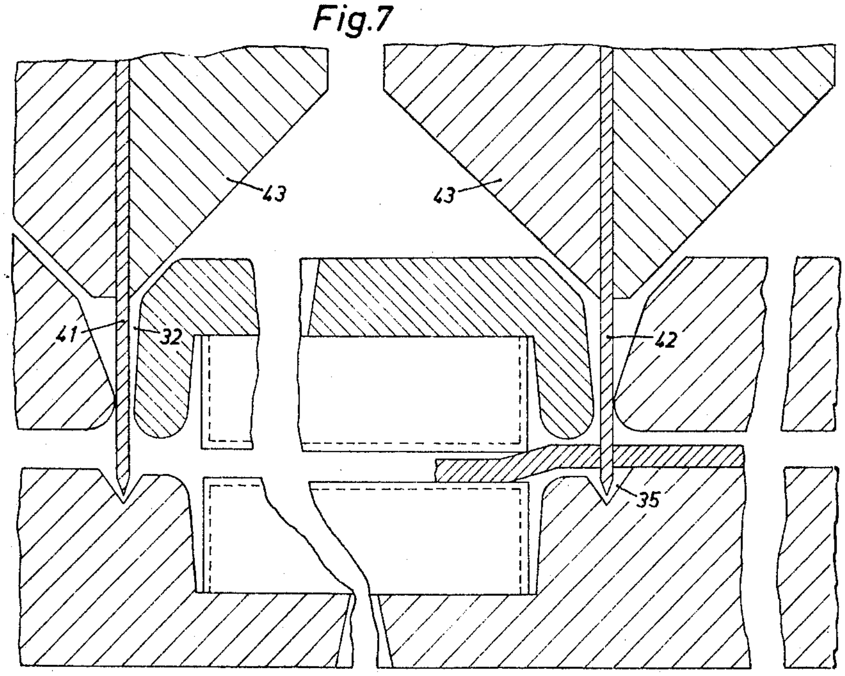
Figure 8:
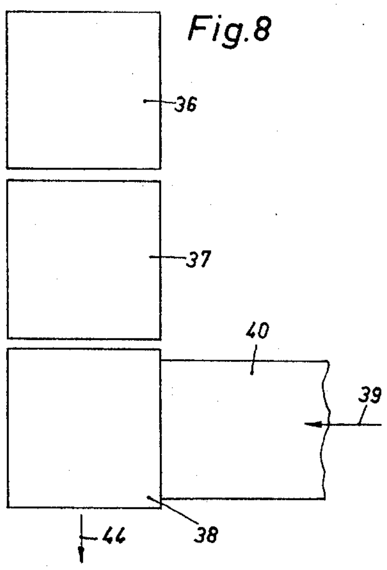
Figures 9, 10, 11:
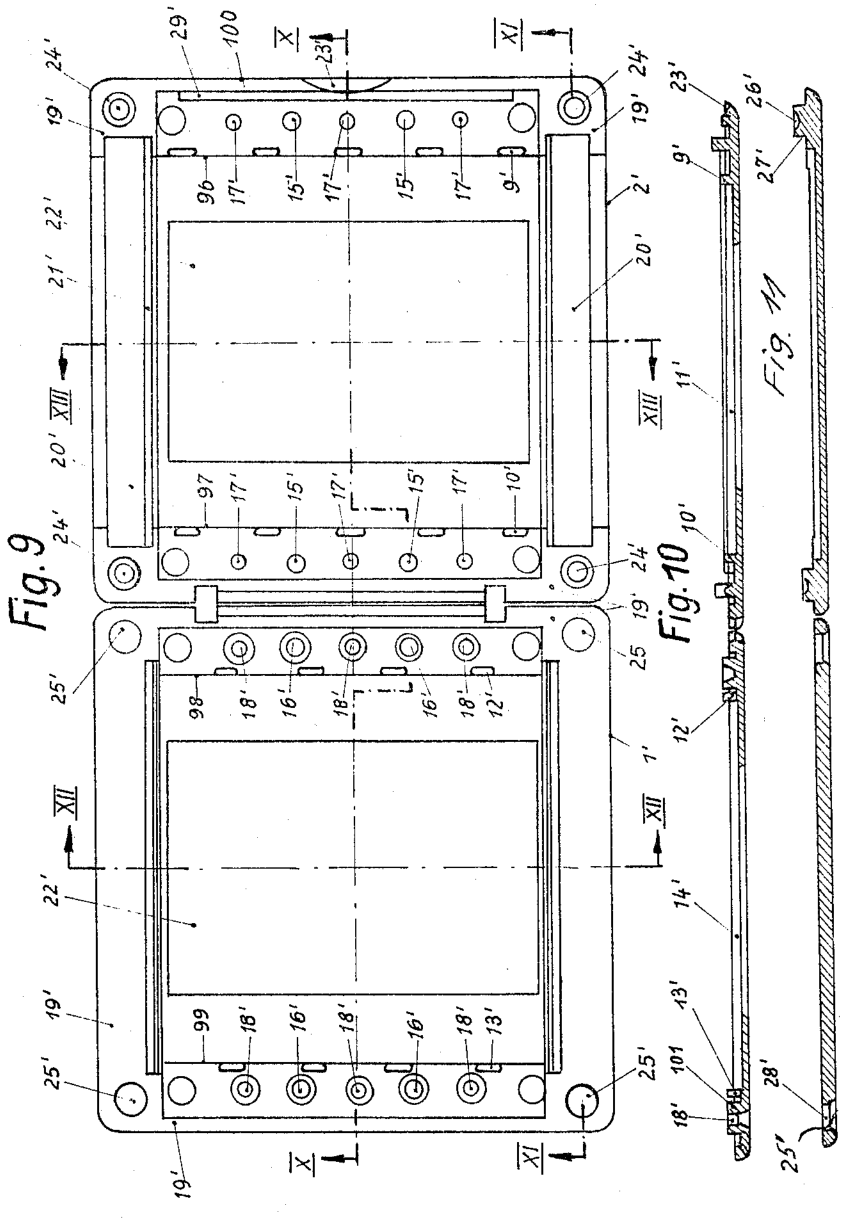
Figures 12, 13, 14:
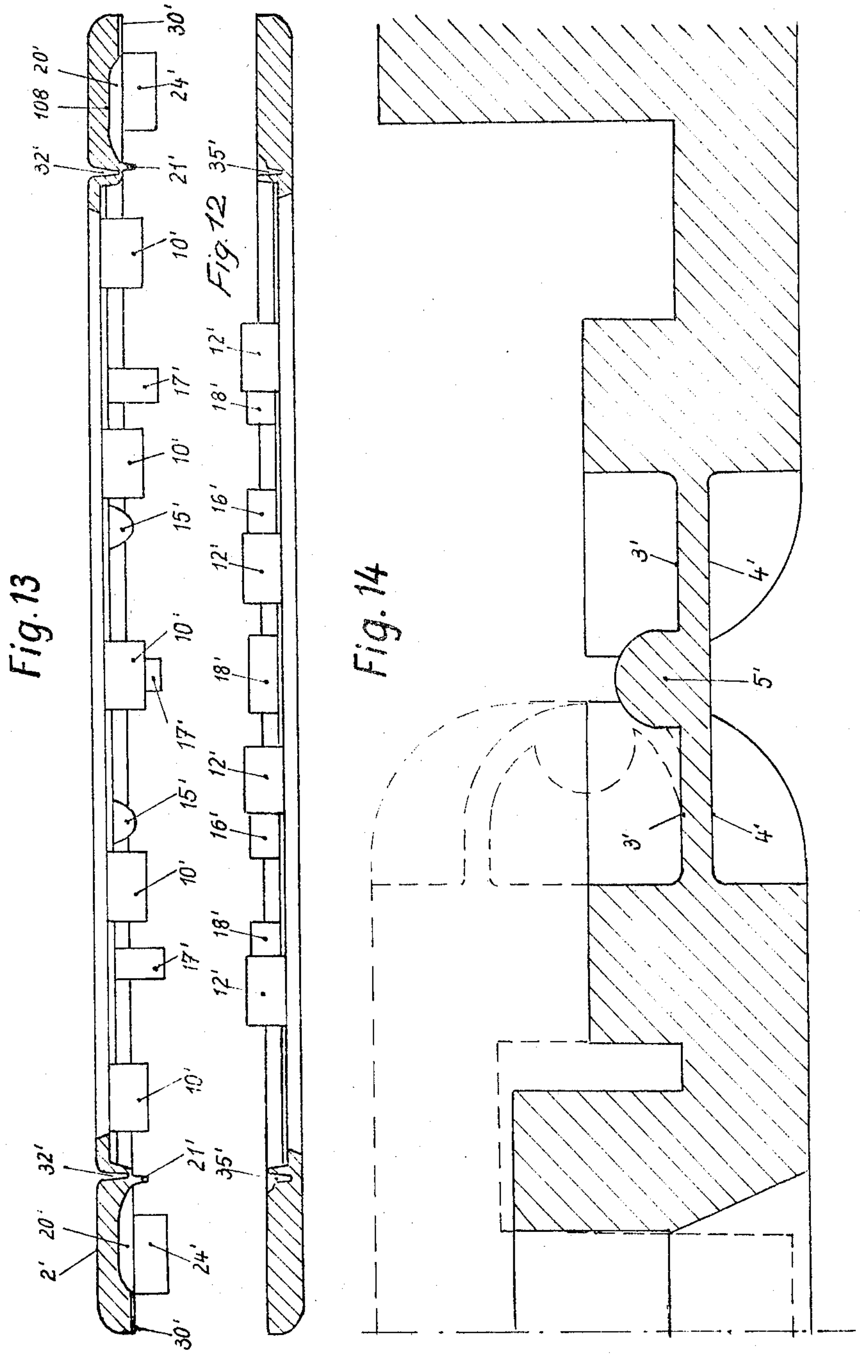
Figure 15:
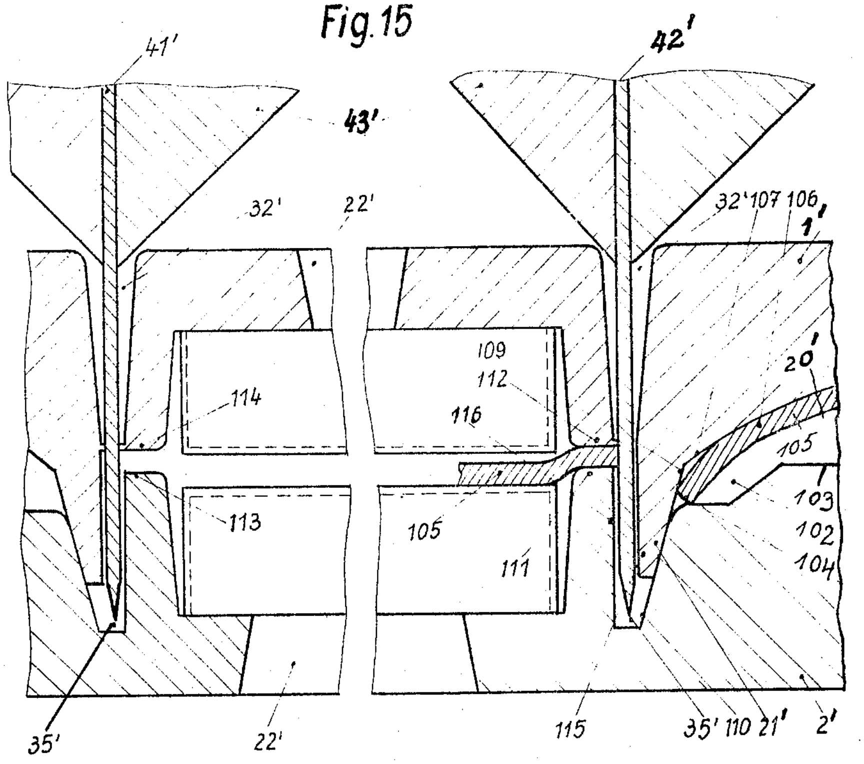
Figure 16:
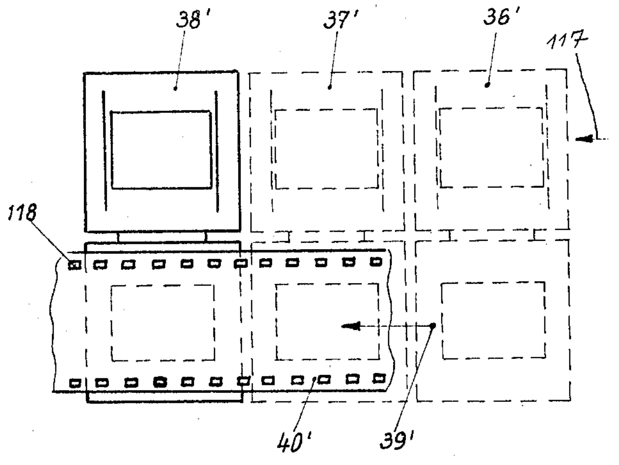
Figure 17:
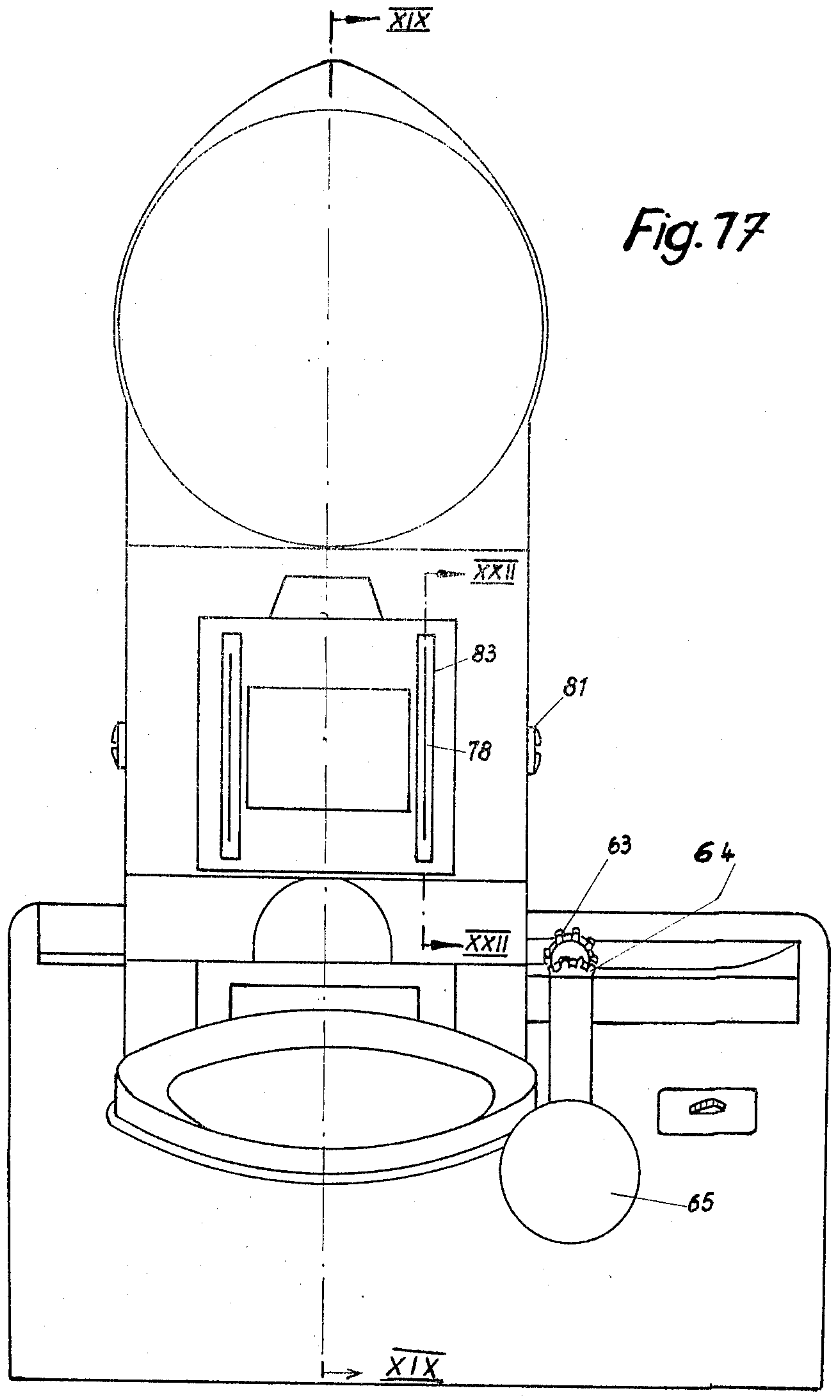
Figure 18:
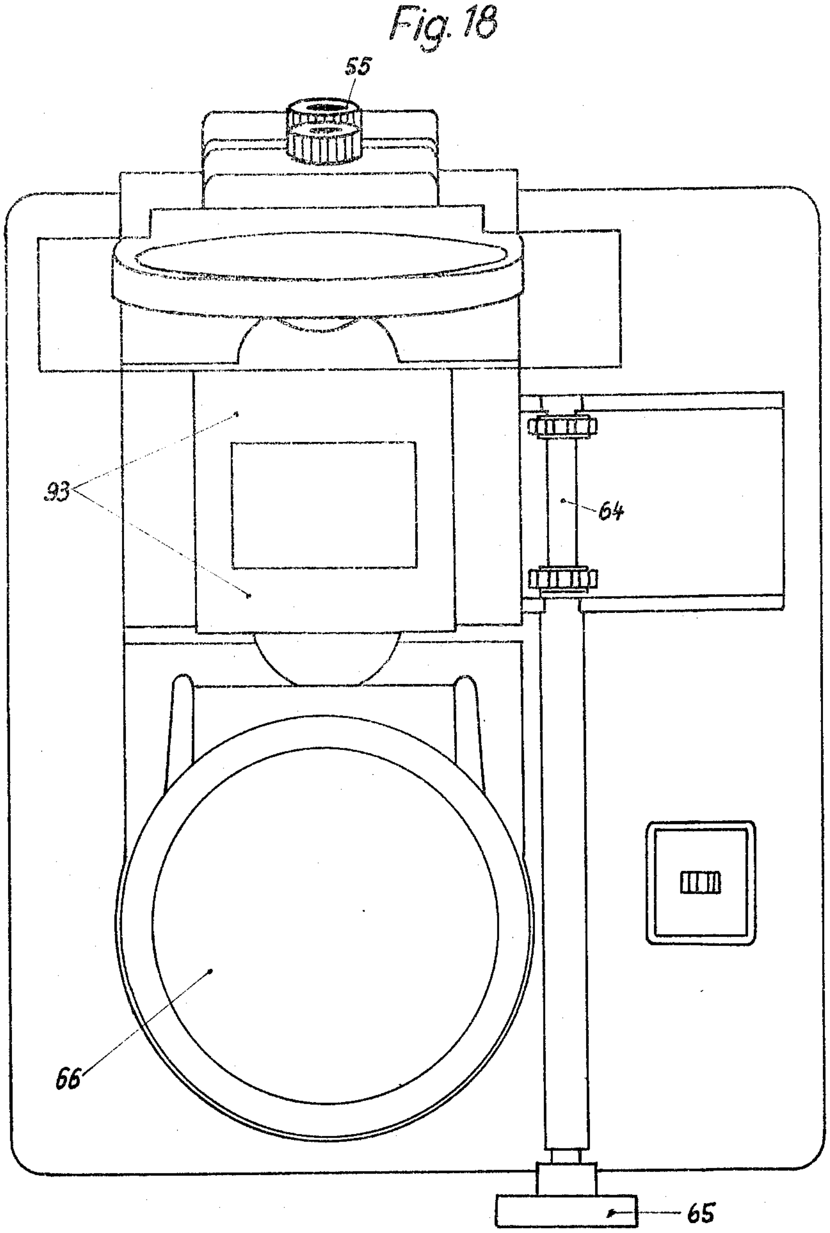
Figure 19:
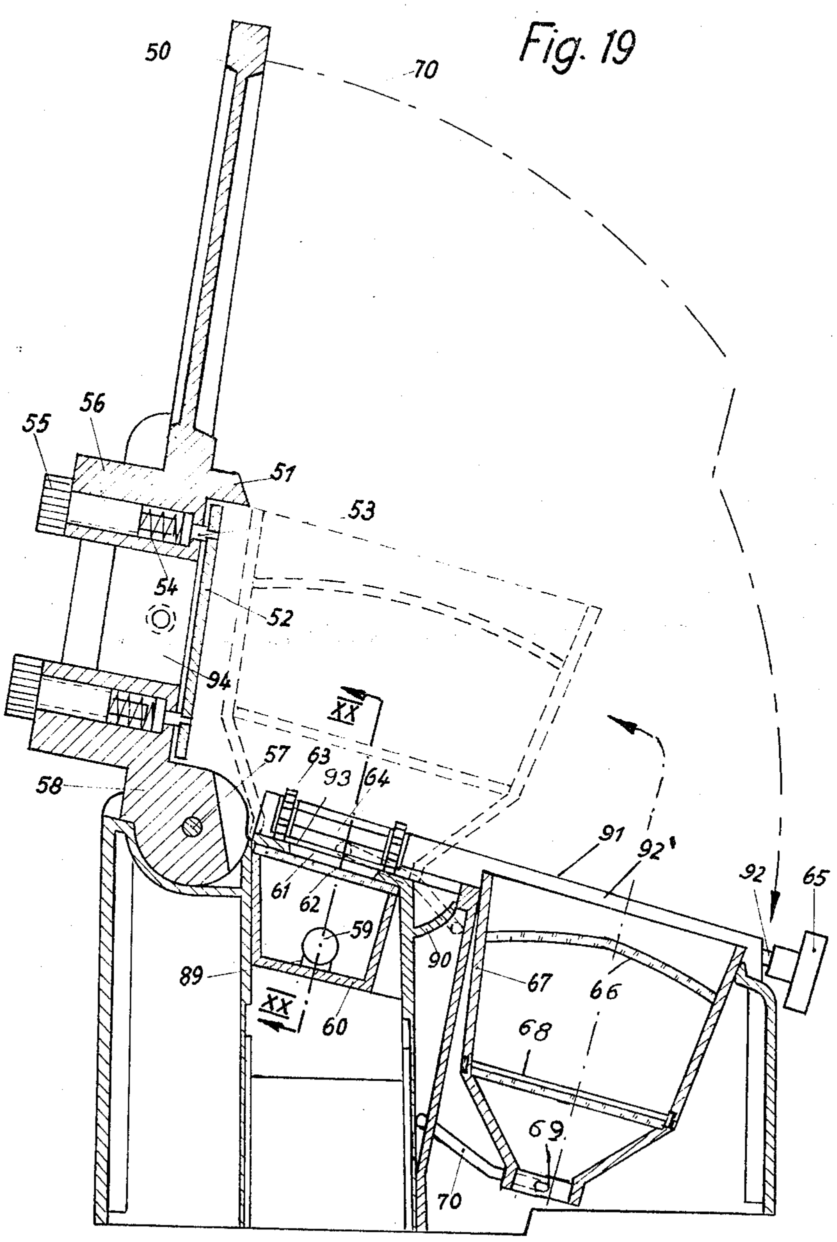
Figure 20:
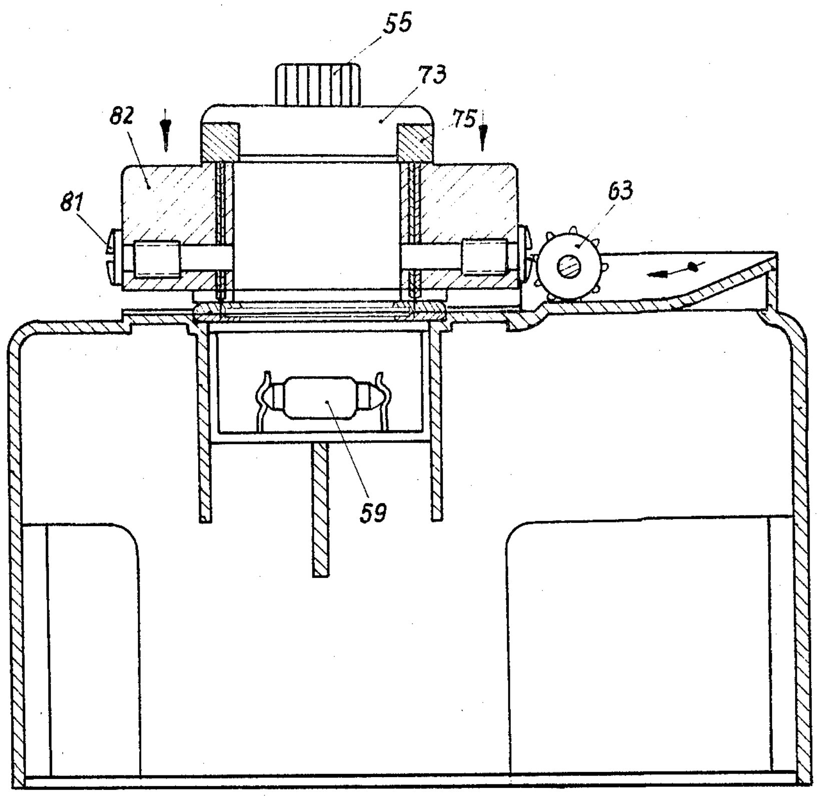
Figures 21, 22:
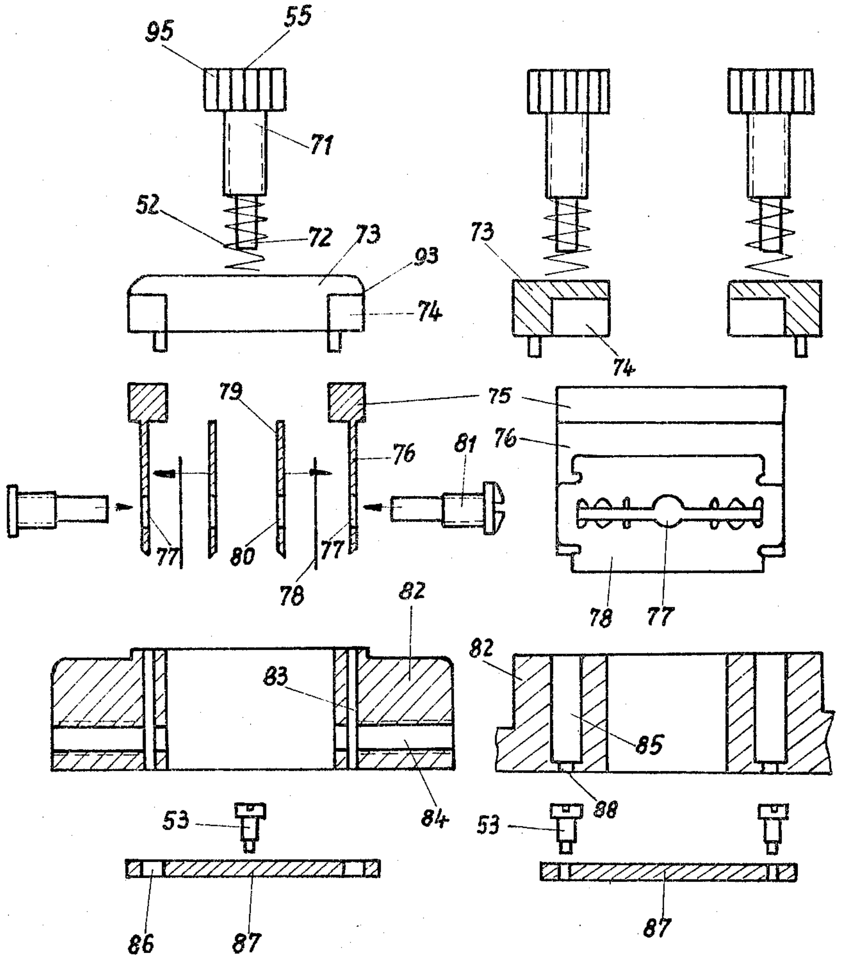

In order that the invention may be more readily understood, embodiments thereof will be illustratively hereunder described by reference to the accompanying drawings in which FIG. 1 is a hingeably folding transparency frame according to the invention in plan, FIG. 2 is the same frame when open shown in a section taken on the line II—II in FIG. 1, FIG. 3 is a similar section taken on the line III—III in FIG. 1, FIG. 4 is another section taken on the line IV—IV in FIG. 1, FIG. 5 is a section taken on the line V—V in FIG. 1, FIG. 6 is a fragmentary section of a transparency frame in the region of the hinge, taken on the line II—II in FIG. 1, and drawn to a larger scale, FIG. 7 is a cross section of parts of a closed transparency frame showing the disposition in principle of the means for cutting the film, FIG. 8 illustrates the principle of the manner in which the frames are fed to the cutting means, showing the frames in plan, FIG. 9 is a different embodiment of a folding transparency frame provided with press-stud fastening means, the frame being shown open in plan, FIG. 10 is a cross section, taken on the line X—X in FIG. 9 of the open transparency frame, FIG. 11 is another cross section of the same frame, taken on the line XI—XI in FIG. 9, FIG. 12 is yet another cross section taken on the line XII—XII in FIG. 9, FIG. 13 is a cross section taken on the line XIII—XIII in FIG. 9, FIG. 14 is a cross section taken on the line X—X in FIG. 9 of the hinge portion of the frame drawn to a larger scale, FIG. 15 is a cutting means resembling that shown in FIG. 7, but of slightly modified construction, FIG. 16 is a representation of the principle of a modified method of disposing the frames and feeding the uncut film, FIG. 17 is a general elevational view of a machine for framing transparencies in folding frames according to the invention, FIG. 18 is a plan view of the machine, FIG. 19 is a section of the machine taken on the line XIX—XIX in FIG. 17, FIG. 20 is a fragmentary section of the machine taken on the line XX—XX in FIG. 19, FIG. 21 is an exploded front elevational representation of the downholder, the cutting means, the assembly frame and associated components and FIG. 22 are same parts seen in side elevation.

The hinged transparency frame in FIGS. 1 to 6 comprises a back portion 1 and a front portion 2 connected together by a flexural hinge at 3. The hinge 3 is formed by a thin connecting web 4 extending across the entire width of the frame and, in virtue of the flexibility of the preferably plastics material, permitting the open halves 1 and 2 of the frame to be closed like a book until they are in the position illustrated in FIG. 6. Conveniently a rib or bulge 5 is formed in the center of the web. More particularly, this rib may be so disposed and shaped that in closed position its crest bears against the side 6 of the back 1 of the frame. This arrangement of the rib has the incidental advantage of limiting the deflection of the flexurally highly stressed portion 7 of the hinge forming web 4 because the rib 5 supports the web against the face of side 6 of the frame. In the absence of such a rib or bulge 5 the right hand side 8 of the web 4 forming the hinge could be inwardly excessively flexed and portion 7 would then be unduly strained and might crack. Moreover, the presence of the rib 5 also permits the conditions of flexure and the deformation of the web 4 to be controlled in a desirable way, as will be understood from FIG. 6 which shows consecutive positions of the hinge-forming web when the halves of the folding frame are being closed.

The portion of the frame forming the back 1 is provided with two projecting bars 9 and 10 locating the film and with a recessed portion 11 for the reception of the back cover glass, whereas the portion forming the front 2 of the frame has a recessed portion 14 between shoulders 12 and 13 for the reception of the front cover glass. In order to ensure the exclusion of dust the edges of the shoulders 12 and 13 are formed with projecting lips 15 and 16 which closely embrace the ends 17 of the bars 9 and 10 when the frame is closed. Moreover, projecting flats 18 and 19 are formed outside the shoulders 12 and 13 of the front portion 2. These engage correspondingly shaped recesses 20 and 21 in the back portion 1 when the two halves of the frame are closed. By bearing against the side faces 22 and 23 they also provide location and hence relieve the hinge of additional strain.

In order to provide positive location in a direction across the projecting flats 18 and 19, the corners of the front portion 2 of the frame are formed with hollow boss-like projections 24 for engagement of corresponding holes 25 in the back portion 1. Moreover, in order to guide the bosses 24 into the holes just before the frame is tightly shut, the end faces 26 of the bosses 24 are formed with rounded edges 27. The edges are thus adapted easily to enter the flared entry openings 28 of the cooperating holes 25 in the back of the frame, permitting the transparency frame to shut smoothly.

In order to permit a film to be successively inserted into a series of frames and the individual transparencies to be simultaneously cut, the back 1 of the frame is provided, parallel to its edges 30, and hence perpendicularly to the hinge-forming web 4, close to the inside edge 31 of the recess 11 for the glass, with cross sectionally tapering cutting slits 32 extending across nearly the entire length 33 of the back of the frame. The contact face 34 of the front portion 2 of the frame is provided with a notch 35 relative to each slit, said notch corresponding in length to the length of the cutting slit 32 and facing the slit when the frame is cloesd.

For automatically loading and closing the frames, open frames 36, 37, 38 are placed side by side as shown in FIG. 8. The film 40 is then fed into frame 38 in the direction indicated by arrow 39, that is to say from the right in FIG. 8, a backing glass having first been inserted into the frame. The film is accurately centered by visual inspection, the cover glass is put into place and the frame is then closed. The film is cut inside the closed frame by cutting means operating at two points, as illustrated in FIG. 7. The cutting means comprise two blades 41, 42 held in mounts 43 and entering the cutting slits 32 from above. The blades cut the film, the blade edges being received into the notches 35. When the film has been cut the blades 41, 42 are retracted in the upward direction, the frame 38 being fully closed and conveyed out of the automatic machine in the direction of arrow 44. At the same time the next empty frame 37 advances into the position previously occupied by frame 38. The film 40 is again advanced into the fresh frame in the direction of arrow 39, adjusted into accurate register, the frame is closed and the cutting operation repeats itself. The described procedure permits the film to be automatically cut and the individual transparencies to be framed.

An alternative improved form of construction of the flexurally hinged transparency frame is illustrated in FIGS. 9 to 14. In this form of construction several of the locating ribs and grooves are eliminated. Instead, the back 1' as well as the front 2' of the frame are provided at two opposite edges 96, 97 and 98, 99 of the recesses 11', 14' for the reception of the glass with glass and film locating projections 9', 10', 12', 13'. The projections in the front and back parts of the frame are relatively staggered in such a way that the projections in one part engage the gaps between the projections in the other part when the two halves are hingeably closed and they thus provide for position of the film. 22' is the window or picture surrounded by the frame in front and rear. On the outside edge 100 of the front 2' of the frame is an arcuate recess 23' for conveniently opening the frame by inserting the nails of two fingers. Parallel to the edges 96 and 97 the front 2' has several coned bosses 15' which are adapted to engage corresponding coned sockets 16' in the back 1' of the frame and which ensure accurate location of the front on the back. Between the locating bosses 15' are press studs 17' adjacent to the edges 96 and 97. These press studs snap into corresponding openings 18' in the back 1' of the frame. As will be understood from FIG. 10 these openings are formed by outwardly flared holes each with a retaining collar 101 inside.

The sides of the frame which are not provided with press studs are formed with contact faces 19' on both the front and the back part of the frame, the front part also being formed with a film-deflecting trough 20' on each side of the window 22', the width of the trough slightly exceeding the width of the film. The edge of the trough 20' adjacent to the window 22' is provided with a sealing rib 21' on each side. For improving the location of the front part of the frame a press stud 24' is also formed at each corner for cooperation with corresponding socket openings 25' in the back part 1' of the frame.

In the embodiment shown in FIG. 15 the notches 35' for the reception of the edges of the cutting blades 41' and 42' are much deeper than in the embodiment illustrated in FIG. 7. Moreover, a special step 102 is provided, which forms a transition between the notch 35' and a face 103 on the back part 2' of the frame. Consequently the portion of the film 105 adjacent to the cut edge 104 is arched downwardly as shown in FIG. 15 by an arcuate face 107 in the front 1' of the frame adjacent to a downwardly projecting extension 21'. The arcuate face merges into the horizontal face 108 of the film-deflecting trough 20'.

During the cutting and closing action the major part of the extension 21' enters notch 35', the inner sloping face 109 of the extension slidably bearing against the cooperating sloping face 110 of notch 35'.

Adjacent to the two blades 41' and 42' the front and the back of the frame are formed with holding flanges 111, 112, their cooperating faces 113, 114 tightly gripping the cut edge of the film 105. Thes lides 15 of the extensions 21' facing the blades 41' and 42' are parallel to the sides of the blades to ensure that the penetrating blades will cleanly cut through the film, said faces providing guiding surfaces for the thin gauge blades. For the same purpose the faces 116 of the flanges 111 in the cover 2' of the frame are likewise parallel to the blades which are thus precisely guided on both sides and cannot be deflected during descent.

FIG. 16 illustrates that the transparency frames can be fed into the apparatus in a slightly different way than that shown in the schematic drawing in FIG. 8. If the frame feed into the frame loading bed 93 is automatic, the frames 36', 37', 38' as well as the films 40' which are fed by the film transporter 64 in the direction of arrow 117 move from the positions shown in dotted outlines into the position 38' shown in full lines, the front 2' of the frame being opened while the frame proceeds from 36' to 38' in such a way that in position 38', i.e. above the loading bed 93, the cover is at an angle of about 100° to the back part 1' of the frame.

For hand feeding, the back and front parts of the frame which are opened out flat are placed into the loading bed 93 relatively slightly angled and, as shown in FIG. 16, the film 40' is pushed from the side under the film transporter 64, FIG. 19. The marginal perforations 118 in the film automatically thread themselves between the pinions 63 and the film is conveyed in feeding direction 117 on to the back 2' of the frame which is ready to receive it. The frame is closed and at the same time the transparency cut from the film by two transverse cuts in a manner that is yet to be described.

To permit the position of the transparency in the frame to be observed, the loading bed 93 is provided with a viewing window 61 with a ground glass screen 62 underneath, which can be illuminated from below by a light source 59 in a chamber 60. The film can thus be clearly viewed and brought into correct register with the window in the frame, this position being subsequently maintained during the closing and cutting operation.

The light source 59 is preferably an incandescent lamp held in a lamp socket 89 in chamber 60.

Deflectably attached to the casing is a magnifying glass 66 which permits a magnified picture of the film in the open or closed transparency frame to be viewed. The magnifying glass 66 is held in a mount 67.

The brightness of the light source 59 can be adapted to requirements by a brightness control knob not specially shown in the drawing.

The apparatus is provided with a control panel from which a cable distributes the low voltage current. This is likewise not illustrated in detail. Moreover, a bracket or guide means is provided for arresting and locating the magnifying glass in operative and inoperative positions.

For advancing the film along a film guideway, a film transporter 64 is provided. This consists of two sprocket wheels 63 with teeth pitched in conformity with the perforations 118 in the film, the wheels being mounted on a shaft 92 running in bearings 92'. The shaft 92 also carries a handwheel 65 at one end for adjusting the fore and aft register of the film in the frame.

Pivotably deflectable about a shaft 57 on the casing of the apparatus is a hinged arm 50, a bearing 58 embracing the shaft 57. This arm is mounted axially in the casing in such a way that a viewing window 94 as well as frame closing and film cutting elements mounted in the arm are precisely centered in relation to the frame loading bed and the open transparency frame when the arm is lowered.

The frame closing and film cutting elements 93 (cf. FIGS. 21 and 22) are all contained in an assembly frame which can be axially mounted in a central window 94 in the tiltable arm 50.

The cutting mechanism comprises a downholder 73 associated with two retaining pins 55. These in conjunction with two compression springs 54 and two sleeves 71 ensure that the folding frame is immediately pushed clear when the tiltable lever is raised again after having cut the film. The compression springs 54 embrace cylindrical extensions 72 on the retaining pins and fit into holes 85 in the assembly frame 82. At their bottom ends the diameters of the holes 85 are reduced to form holes 88 for the reception of stud bolts 53 whose heads rest on the shoulder formed by the reduction in diameter between 85 and 88. The bottom threaded ends of the stud screws 53 project from the assembly frame 82 for attachment thereto of the downholder plate 87 which is provided with cooperating tapped holes 86.

The downholder 73 is formed with recesses 74 for the reception of the enlarged heads 75 of blade holders 76 to which the cutting blades 78 are clamped by backing plates 79 and retaining bolts 81 inserted through holes 77 and 80 in the blade holder 76, the blade 78 and the backing plate 79. The bolts screw into tapped holes 84 in the assembly frame, the blade holders and the backing plates being insertable into longitudinal grooves 83 in the assembly frame. The blade 78 itself may be an ordinary safety razor blade and bolt 81 can be pushed through the usual center hole in the blade.

I claim:

1. A film transparency frame comprising a molded front portion and an identical back portion; a flexural hinge extending the entire width of, and connecting, said portions; said hinge having a rib substantially in its center and extending the full length of said hinge; said back portion being provided with means for positioning said film; both said front and back portions being provided with means for accommodating cover glasses, means for keeping said portions in closed position; and loading and registering means for said film.

2. A film transparency frame comprising a molded front portion and an identical back portion; a flexural hinge extending the entire width of, and connecting, said portions, said hinge being a web having tapering cross section so as to rotate in a controlled spiral path thus avoiding kinking and buckling upon closing of the frame; said back portion being provided with means for positioning said film; both said front and back portions being provided with means for accommodating cover glasses; means for keeping said portions in closed position; and loading and registering means for said film.

3. The frame as defined in claim 2, wherein said means for positioning the film are projecting bars.

4. The frame as defined in claim 3, wherein said means for accommodating cover glasses are recesses in said back portion, disposed between projecting bars; and recesses in said front portion, disposed between said shoulders.

5. The frame as defined in claim 4, wherein said back portion is provided with a cross-sectionally tapering cutting slit, perpendicularly to said hinge and closely adjacent to said recesses; said slit extending substantially the entire length of said back portion; said front portion having a corresponding notch in its cooperating inside part facing said slit; said slit accommodating a cutting blade.

References Cited by the Examiner

UNITED STATES PATENTS

| | | | |
|---|---|---|---|
| 2,889,645 | 6/1959 | Thieme | 40—152 |
| 3,200,527 | 8/1965 | Chark | 40—152 |

FOREIGN PATENTS

| | | |
|---|---|---|
| 1,163,657 | 4/1928 | France. |
| 1,125,200 | 3/1962 | Germany. |
| 960,447 | 6/1964 | Great Britain. |

EUGENE R. CAPOZIO, *Primary Examiner.*

W. J. CONTRERAS, *Assistant Examiner.*